United States Patent
Tosa et al.

(10) Patent No.: US 9,626,871 B2
(45) Date of Patent: Apr. 18, 2017

(54) INTER-VEHICLE COMMUNICATION DEVICE

(71) Applicant: Mitsubishi Electric Corporation, Tokyo (JP)

(72) Inventors: Takatoshi Tosa, Tokyo (JP); Yuji Hamada, Tokyo (JP); Shinji Akatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/021,081

(22) PCT Filed: Nov. 18, 2013

(86) PCT No.: PCT/JP2013/081034
§ 371 (c)(1),
(2) Date: Mar. 10, 2016

(87) PCT Pub. No.: WO2015/072032
PCT Pub. Date: May 21, 2015

(65) Prior Publication Data
US 2016/0232791 A1  Aug. 11, 2016

(51) Int. Cl.
*G08G 1/00* (2006.01)
*B60W 30/14* (2006.01)
(Continued)

(52) U.S. Cl.
CPC .............. *G08G 1/22* (2013.01); *B60W 30/14* (2013.01); *G08G 1/093* (2013.01);
(Continued)

(58) Field of Classification Search
CPC ...... H04L 67/12; H04L 67/06; H04W 28/021; H04W 4/023; H04W 4/04; H04W 4/046;
(Continued)

(56) References Cited

U.S. PATENT DOCUMENTS 6,356,189 B1 * 3/2002 Fujimaki ................ G08G 1/162
340/465
6,765,495 B1 * 7/2004 Dunning ................ G08G 1/161
340/435
(Continued)

FOREIGN PATENT DOCUMENTS

JP  2009-246931 A   10/2009
JP  2010-220050 A   9/2010
(Continued)

OTHER PUBLICATIONS

International Search Report for PCT/JP2013/081034 dated Dec. 10, 2013.

*Primary Examiner* — Naomi Small
(74) *Attorney, Agent, or Firm* — Sughrue Mion, PLLC; Richard C. Turner

(57) ABSTRACT

A leading vehicle group 1 transmits divided data 71 and 72 obtained by dividing vehicle information 7. Data transfer vehicle groups 2 and 3 transfer the divided data 71 and 72 to a data composite vehicle group 4 and to following vehicle groups 5 and 6. The data composite vehicle group 4 transfers composite data 73 obtained by XORing the divided data 71 and 72 to the following vehicle groups 5 and 6. The following vehicle group 5 XORs the divided data 71 received from the data transfer vehicle group 2 with the composite data 73 received from the data composite vehicle group 4 to restore the unreceived divided data 72.

14 Claims, 10 Drawing Sheets

(51) Int. Cl.
*G08G 1/09* (2006.01)
*G08G 1/0967* (2006.01)
*G08G 1/16* (2006.01)
*H04W 4/04* (2009.01)
*H04L 29/08* (2006.01)
*H04W 4/18* (2009.01)
*H04W 4/20* (2009.01)
*H04W 4/02* (2009.01)
*H04W 4/08* (2009.01)
*H04W 28/02* (2009.01)
*H04W 84/18* (2009.01)

(52) U.S. Cl.
CPC . *G08G 1/096716* (2013.01); *G08G 1/096725* (2013.01); *G08G 1/096741* (2013.01); *G08G 1/096791* (2013.01); *G08G 1/163* (2013.01); *H04L 67/06* (2013.01); *H04W 4/023* (2013.01); *H04W 4/04* (2013.01); *H04W 4/046* (2013.01); *H04W 4/08* (2013.01); *H04W 4/18* (2013.01); *H04W 4/20* (2013.01); *H04W 28/021* (2013.01); *H04L 67/12* (2013.01); *H04W 84/18* (2013.01)

(58) Field of Classification Search
CPC ........... H04W 4/08; H04W 4/18; H04W 4/20; H04W 84/18; B60W 30/14; G08G 1/093; G08G 1/096716; G08G 1/096725; G08G 1/096741; G08G 1/096791; G08G 1/163; G08G 1/22

USPC .......................................................... 340/901
See application file for complete search history.

(56) References Cited

U.S. PATENT DOCUMENTS

| | | | |
|---|---|---|---|
| 8,466,807 B2* | 6/2013 | Mudalige | G08G 1/163 340/435 |
| 2008/0122607 A1* | 5/2008 | Bradley | B60Q 1/0017 340/468 |
| 2010/0049819 A1 | 2/2010 | Hamada et al. | |
| 2010/0240299 A1 | 9/2010 | Karino | |
| 2012/0323406 A1* | 12/2012 | Yamashiro | G08G 1/161 701/2 |
| 2014/0131977 A1* | 5/2014 | Yamashiro | B62D 12/02 280/426 |
| 2015/0091740 A1* | 4/2015 | Bai | G08B 21/06 340/901 |
| 2015/0228195 A1* | 8/2015 | Beaurepaire | G08G 1/0962 340/907 |
| 2016/0358477 A1* | 12/2016 | Ansari | G08G 1/167 |

FOREIGN PATENT DOCUMENTS

| | | |
|---|---|---|
| JP | 2013-012154 A | 1/2013 |
| WO | 2008/099716 A1 | 8/2008 |

\* cited by examiner

FIG.3

| | | | | | | | |
|---|---|---|---|---|---|---|---|
| Leading Vehicle Group 1 | Channel A | | Channel B | | Channel A | | Channel B |
| Data Transfer Vehicle Group 2 | Channel A | | Channel B | | Channel A | | Channel B |
| Data Transfer Vehicle Group 3 | Channel A | | Channel B | | Channel A | | Channel B |
| Data Composite Vehicle Group 4, and The Following Vehicle Groups 5 and 6 | Channel A | | Channel B | | Channel A | | Channel B |

FIG. 10

| | | | | |
|---|---|---|---|---|
| Leading Vehicle Group 1 | Channel A | Channel B | Channel A | Channel B |
| Data Transfer Vehicle Group 2 | Channel A | Channel C | Channel A | Channel C |
| Data Transfer Vehicle Group 3 | Channel D | Channel B | Channel D | Channel B |
| Data Composite Vehicle Group 4, and The Following Vehicle Groups 5 and 6 | Channel D | Channel C | Channel D | Channel C |

INTER-VEHICLE COMMUNICATION DEVICE

CROSS REFERENCE TO RELATED APPLICATIONS

This application is a National Stage of International Application No. PCT/JP2013/081034 filed Nov. 18, 2013, the contents of all of which are incorporated herein by reference in their entirety.

TECHNICAL FIELD

The present invention relates to an inter-vehicle communication device that carries out inter-vehicle communication (communication between vehicles).

BACKGROUND ART

Inter-vehicle communication devices have been widely known which gives support such as vehicle control (auto cruise control, for example) and follow-up driving by sharing vehicle information among a plurality of vehicles using inter-vehicle communication. However, the conventional inter-vehicle communication devices, which repeat transfer of data in such a manner that a transmission source vehicle transmits data to surrounding vehicles, and which receive the data and further transmit the data to their surrounding vehicles, have a problem of incurring congestion due to excessive retransfer of the same data because of the repeated transfer of the data even after the completion of the data sharing. There is another problem in that limiting the number of times of the transfer to solve the problem of the congestion has an adverse effect on the support such as that some vehicles cannot receive the data. In addition, if the congestion occurs, it can bring about communication delay throughout the inter-vehicle communication, thus offering a problem of affecting other support services using the inter-vehicle communication.

Thus, in Patent Document 1 and Patent Document 2, for example, when sharing data among a plurality of vehicles, a transmission source vehicle divides data and transmits the divided data separately to other vehicles, and the vehicles that receive the divided data transmit and receive unreceived divided data from each other, thereby reducing the amount of the transmission data and suppressing the congestion.

In addition, Patent. Document 3, for example, constructs a network at the time of the inter-vehicle communication between a plurality of vehicles, and transfers data in accordance with a communication path in the network, thereby preventing excessive data transfer.

PRIOR ART DOCUMENT

Patent Document

Patent Document 1: Japanese Patent Laid-Open No. 2013-12154.
Patent Document 2: Japanese Patent Laid-Open No. 2010-220050.
Patent Document 3: Japanese Patent Laid-Open No. 2009-246931.

DISCLOSURE OF THE INVENTION

Problems to be Solved by the Invention

Although the communication methods of the Patent Document 1 and Patent Document 2 suppress the congestion by reducing the amount of transmission data by transmitting and receiving the divided data, when transmitting and receiving the unreceived divided data between the vehicles, they have a problem of being unable to prevent the excessive data transfer, which is a conventional problem.

In addition, as for the communication method of the Patent Document 3, since it constructs the network based on one-to-one correspondence, it is unsuitable for the inter-vehicle communication based on point-to-multipoint wireless communication, and the number of times of data transfer increases to share the data among the plurality of vehicles. Thus, it sometimes offers a problem of incurring communication delay, The present invention is implemented to solve the foregoing problems. Therefore it is an object of the present invention to ease the congestion and to reduce the amount of data transfer when sharing data among a plurality of vehicles.

Means for Solving the Problems

An inter-vehicle communication device in accordance with the present invention comprises: a communicator to exchange data between its own vehicle and other vehicles between which inter-vehicle communication is established; a vehicle information acquirer to obtain vehicle information about its own vehicle; a divided data generator to create a plurality of divided data by dividing the vehicle information the vehicle information acquirer obtains; an XOR circuit to create composite data by XORing a plurality of divided data obtained from other vehicles via the communicator, or to restore remaining divided data by XORing a part of the divided data with the composite data obtained from other vehicles via the communicator; and a controller to switch a communication control method in accordance with a vehicle group, to which its own vehicle belongs, in an inter-vehicle communication network including a leading vehicle group, a data transfer vehicle group capable of inter-vehicle communication with the leading vehicle group, a data composite vehicle group capable of inter-vehicle communication with the data transfer vehicle group, and a following vehicle group capable of inter-vehicle communication with the data transfer vehicle group and the data composite vehicle group, wherein the controller: causes, when its own vehicle belongs to the leading vehicle group, the vehicle information acquirer to obtain the vehicle information, the divided data generator to create a plurality of divided data, and the communicator to transmit the divided data to the data transfer vehicle group; causes, when its own vehicle belongs to the data transfer vehicle group, the communicator to receive the plurality of divided data to restore the vehicle information, and causes the communicator to transmit a part of the divided data to the data composite vehicle group and to the following vehicle group; causes, when its own vehicle belongs to the data composite vehicle group, the communicator to receive all the divided data the data transfer vehicle group transmits to restore the vehicle information, causes the XOR circuit to create the composite data, and causes the communicator to transmit the composite data to the following vehicle group; and causes, when its own vehicle belongs to the following vehicle group, the communicator to receive the part of the divided data the data transfer vehicle group transmits and the composite data the data composite vehicle group transmits, causes the XOR circuit to restore the remaining divided data, and restores the vehicle information from the part of the divided data and the remaining divided data.

Advantages of the Invention

According to the present invention, the leading vehicle side of the inter-vehicle communication network transmits the divided data resulting from dividing the vehicle information or transmits the composite data which is the XOR of the divided data, and the following vehicle side restores the unreceived remaining divided data from a part of the divided data and the composite data. Accordingly, it can reduce the amount of the data transfer among the vehicle groups and ease the congestion.

BRIEF DESCRIPTION OF THE DRAWINGS

FIG. 3 is a diagram illustrating a communication channel switching manner of the individual vehicle groups in the embodiment 1;

FIG. 10 is a diagram illustrating a communication channel switching manner of the individual vehicle groups in an embodiment 2 in accordance with the present invention;

BEST MODE FOR CARRYING OUT THE INVENTION

The best mode for carrying out the invention will now be described with reference to the accompanying drawings to explain the present invention in more detail.

Embodiment 1

Figure 1:
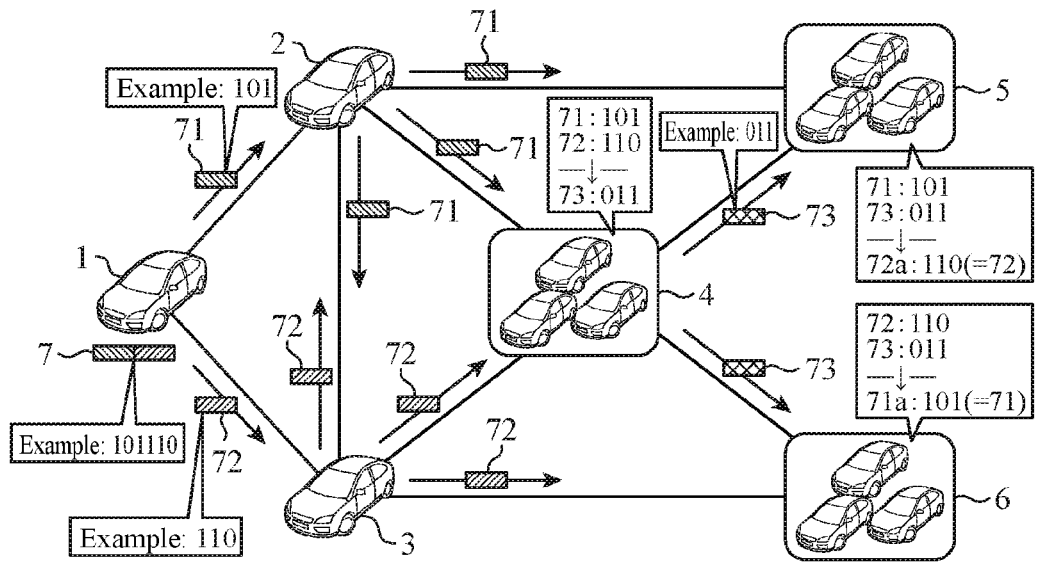
FIG. 1 is a schematic diagram showing an inter-vehicle communication network of vehicles to which an inter-vehicle communication device of an embodiment 1 in accordance with the present invention is applied.

In the present invention, as shown in the schematic diagram of FIG. 1, a plurality of vehicles among which inter-vehicle communication has been established are divided into a leading vehicle group 1; data transfer vehicle groups 2 and 3 capable of communicating with the leading vehicle group 1; a data composite vehicle group 4 capable of communicating with both the data transfer vehicle groups 2 and 3; a following vehicle group 5 capable of communicating with any vehicles in the data transfer vehicle group 2 and data composite vehicle group 4; and a following vehicle group 6 capable of communicating with any vehicles in the data transfer vehicle group 3 and data composite vehicle group 4.

As for the leading vehicle group 1 and the data transfer vehicle group 2 or 3, it is assumed that a single vehicle constitutes each of them. As for the data composite vehicle group 4 and the following vehicle group 5 or 6, it is assumed that one or more vehicles constitute each of them. In addition, as for the following vehicle groups 5 and 6, one of them is enough. Thus, the inter-vehicle communication network can be composed of five vehicles at minimum.

To share the vehicle information among the plurality of vehicles shown in FIG. 1, vehicle information 7 (101110, for example) of the leading vehicle group 1 is divided into two parts, divided data 71 (101, for example) and divided data 72 (110, for example), and the leading vehicle group 1 transmits them separately to the data transfer vehicle groups 2 and 3.

When the data transfer vehicle groups 2 and 3 receive the divided data 71 and 72, respectively, the data transfer vehicle group 2 carries out broadcast transfer of the divided data 71 to the data transfer vehicle group 3, the data composite vehicle group 4 and the following vehicle group 5 within a communication area. On the other hand, the data transfer vehicle group 3 carries out broadcast transfer of the divided data 72 to the data transfer vehicle group 2, the data composite vehicle group 4 and the following vehicle group 6 within the communication area.

Finally, any vehicle belonging to the data composite vehicle group 4, receiving all the (two) divided data 71 (101, for example) and divided data 72 (110, for example), performs the exclusive OR (XOR) of the divided data 71 and 72, each handled as a bit string, to create the composite data 73 (011, for example), and transfers the composite data 73 to the following vehicle groups 5 and 6.

All the vehicles belonging to the following vehicle group 5 XOR the composite data 73 (011, for example) with the already received divided data 71 (101, for example) to restore the unreceived divided data 72 (110, for example). From now on, the restored divided data 72 is referred to as the restored divided data 72a (110, for example), Likewise, all the vehicles belonging to the following vehicle group 6 XOR the composite data 73 (011, for example) with the already received divided data 72 (110, for example) to restore the unreceived divided data 71 (101, for example). From now on, the restored divided data 71 is referred to as the restored divided data 71a (101, for example).

Thus, the data transfer vehicle groups 2 and 3 and data composite vehicle group 4 can restore the vehicle information 7 by combining the divided data 71 and the divided data 72.

In addition, even if the following vehicle group 5 does not receive the divided data 72, it can obtain the restored divided data 72a from the composite data 73, and thus can restore the vehicle information 7 (101110, for example) by combining the received divided data 71 (101, for example) with the restored divided data 72*a* (110, for example). Likewise, even if the following vehicle group 6 does not receive the divided data 71, it can obtain the restored divided data 71*a* from the composite data 73, and thus can restore the vehicle information 7 (101110, for example) by combining the restored divided data 71*a* (101, for example) with the received divided data 72 (110, for example).

The basic conception of the present invention is as described above, and it can improve the transmission efficiency of the network as compared with the conventional inter-vehicle communication network.

Next, the inter-vehicle communication device of the embodiment 1 in accordance with the present invention will be described.

Figure 2:
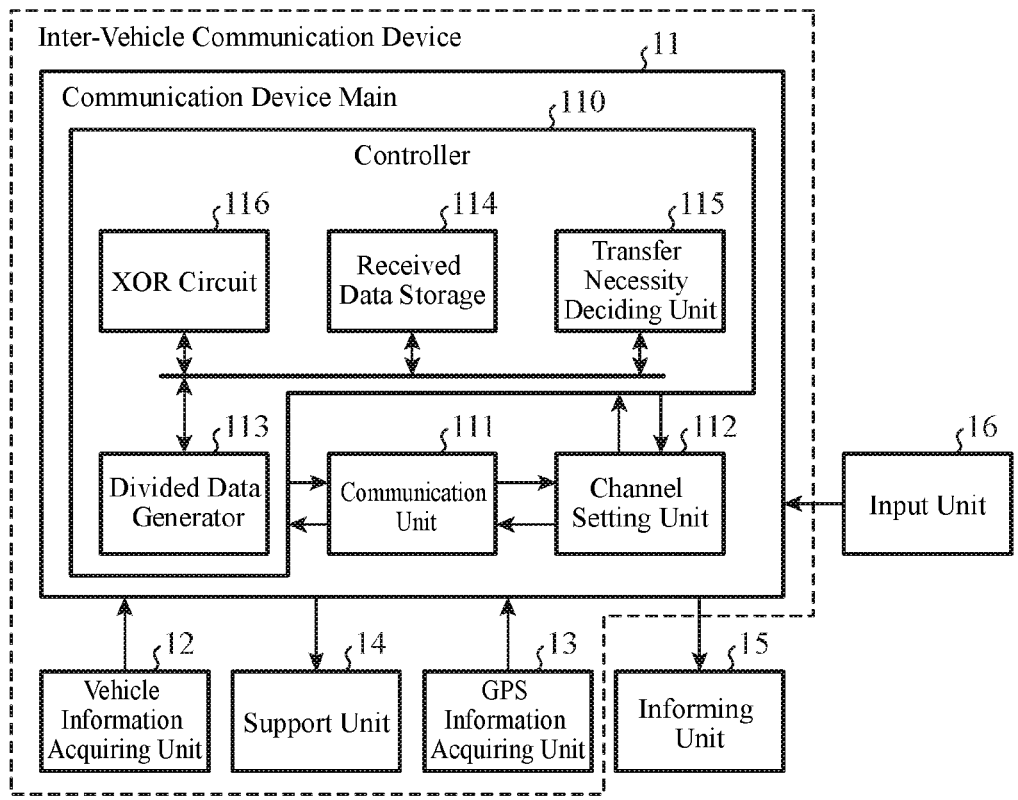
FIG. 2 is a block diagram showing a configuration of an inter-vehicle communication device of the embodiment 1.

As shown in the block diagram of FIG. 2, the inter-vehicle communication device comprises a communication device main 11, a vehicle information acquiring unit 12, a GPS (Global Positioning System) information acquiring unit 13, and a support unit 14. In addition, the communication device main 11 uses an informing unit 15 and an input unit 16 as external equipment. The inter-vehicle communication shown in FIG. 1 is implemented by vehicles equipped with the inter-vehicle communication device with the foregoing configuration.

The vehicle information acquiring unit 12 obtains the information (vehicle information. 7 shown in FIG. 1) about the vehicle equipped with the inter-vehicle communication device. It is assumed that the vehicle information includes at least vehicle positional information of the vehicle. As for the vehicle positional information, we do not care about its acquiring method: it can be obtained by the vehicle information acquiring unit 12 itself, or it can utilize the GPS information obtained by the GPS information acquiring unit 13 which will be described later. The vehicle information the vehicle information acquiring unit 12 obtains is input to the communication device main 11, and if the vehicle belongs to the leading vehicle group 1, the vehicle information is transmitted from the communication unit 111 to other vehicle groups.

The GPS information acquiring unit 13 obtains the GPS information of the vehicle equipped with the inter-vehicle communication device, and inputs the GPS information to the communication device main 11. Incidentally, the GPS positional information the GPS information acquiring unit 13 obtains can be handled as the vehicle positional information as described above, and can be used as a part of the vehicle information.

The support unit 14 provides various support according to the vehicle information obtained from the vehicle or from other vehicles via the communication device main 11. In the present invention, we do not care about the type of the support contents such as auto cruise control, rear-end collision prevention, and follow-up driving.

Incidentally, the vehicle information acquiring unit 12, GPS information acquiring unit 13 and support unit 14 can be installed in the same casing as the communication device main 11, or in separate casings. For example, it is easily conceivable to use an existing vehicle ECU (Electronic Control Unit) as the vehicle information acquiring unit 12, to use an existing GPS receiver as the GPS information acquiring unit 13, and to use an existing car navigation system as the support unit 14.

In addition, the monitor or speaker of an existing car navigation system can be used as the informing unit 15, and the touch panel of the existing car navigation system can be used as the input unit 16.

An internal configuration of the communication device main 11 will be described from now on.

The communication unit 111 performs wireless communication with the inter-vehicle communication devices mounted on vehicles. We do not care about a communication method used by the communication unit 111. The channel setting unit 112 sets a frequency band (communication channel) the communication unit 111 uses for the wireless communication. Here, it is assumed that the channel setting unit 112 sets the frequency band at a startup and at establishing communication. When two or more frequency bands are necessary for the communication (one of them is used for receiving data, and the other for transmitting data, for example), parallel communication is carried out by switching frequency at every regular period. The channel setting unit 112 uses the GPS time information input from the GPS information acquiring unit 13 for measuring the regular period, thereby synchronizing the frequency switching between the plurality of vehicles.

The controller 110 carries out various control relating to the inter-vehicle communication. More specifically, it decides the vehicle group to which the vehicle belongs, checks the necessity of data transfer in accordance with the vehicle group to which the vehicle belongs, and selects and creates the transfer data.

As for the necessity of the data transfer in accordance with the vehicle group to which the vehicle belongs, the transfer necessity deciding unit 115 decides it. As for the selection and creation of the transfer data, the divided data generator 113, received data storage 114 and XOR circuit 116 execute it in cooperation. As for the decision of the vehicle group to which the vehicle belongs, since the controller 110 can make it by itself, or the controller 110 can acquire the result of an external decision, it is not shown in the functional blocks of FIG. 2.

When the vehicle belongs to the leading vehicle group 1, the controller 110 issues an instruction to the divided data generator 113.

In response to the instruction from the controller 110, the divided data generator 113 divides the input vehicle information 7 (101110, for example) into two data (101 and 110, for example), and adds as the header information the received data size and a sequence number (a number indicating what place the divided data is from the top) to each data, thereby creating the divided data 71 and 72.

The divided data 71 includes the received data size "3 bits", the sequence number "1", and the bit string "101". The divided data 72 includes the received data size "3 bits", the sequence number "2", and the bit string "110".

The received data storage 114 stores at least one of the divided data 71 and 72, composite data 73 the communication unit 111 receives, and the restored divided data 71*a* and 72*a* the XOR circuit 116 creates. In addition, when the received data storage 114 has already stored all the divided data 71 and 72 (or the restored divided data 71*a* and 72*a*), it stores the vehicle information 7 restored from these data. It is assumed that the controller 110 and the individual components in the controller 110 can refer to the individual items of the information stored.

When the vehicle belongs to the data composite vehicle group 4, the controller 110 issues a command to the transfer necessity deciding unit 115.

In response to the command from the controller 110, the transfer necessity deciding unit 115 decides whether to transfer data to other vehicles or not. More specifically, when the vehicle group to which the vehicle belongs is the data composite vehicle group 4, and when none of the vehicles in the data composite vehicle group 4 has transmitted the composite data 73, the transfer necessity deciding unit 115 decides that the composite data 73 the received data storage 114 stores has to be transferred. The decision result is output from the transfer necessity deciding unit 115 to the controller 110, In addition, when all the vehicles constituting the inter-vehicle communication network are in the inter-vehicle communication area of the leading vehicle group 1, the transfer necessity deciding unit 115 decides not to transfer the received data to the other vehicle groups.

When the vehicle belongs to the data composite vehicle group 4 or to the following vehicle group 5 or 6, the controller 110 issues a command to the XOR circuit 116, In response to the command from the controller 110, the XOR circuit 116 calculates the XOR of the bit strings excluding the header information from the received divided data 71 and divided data 72, thereby creating the composite data 73. After adding the header information (whose sequence number is made "0") to the composite data 73 it creates, the XOR circuit 116 transfers it via the communication unit 111.

In addition, in response to the command from the controller 110, the XOR circuit 116 calculates the XOR of the bit strings excluding the header information from the received divided data 71 (or the divided data 72) and the composite data 73, thereby restoring the restored divided data 72a (or restored divided data 71a).

The operation of the inter-vehicle communication device will be described below by dividing it into (1) at vehicle group decision, and (2) at data transfer. Incidentally, it is assumed in the embodiment 1 that the channel setting unit 112 has established the communication channel of the communication unit 111 just as shown in FIG. 3. This enables all the vehicles that establish the inter-vehicle communication to carry out communication via the two common channels (channel A and channel B in FIG. 3), and channel switching of the inter-vehicle communication devices of all the vehicles is synchronized.

(1) At Vehicle Group Decision

Figure 4:
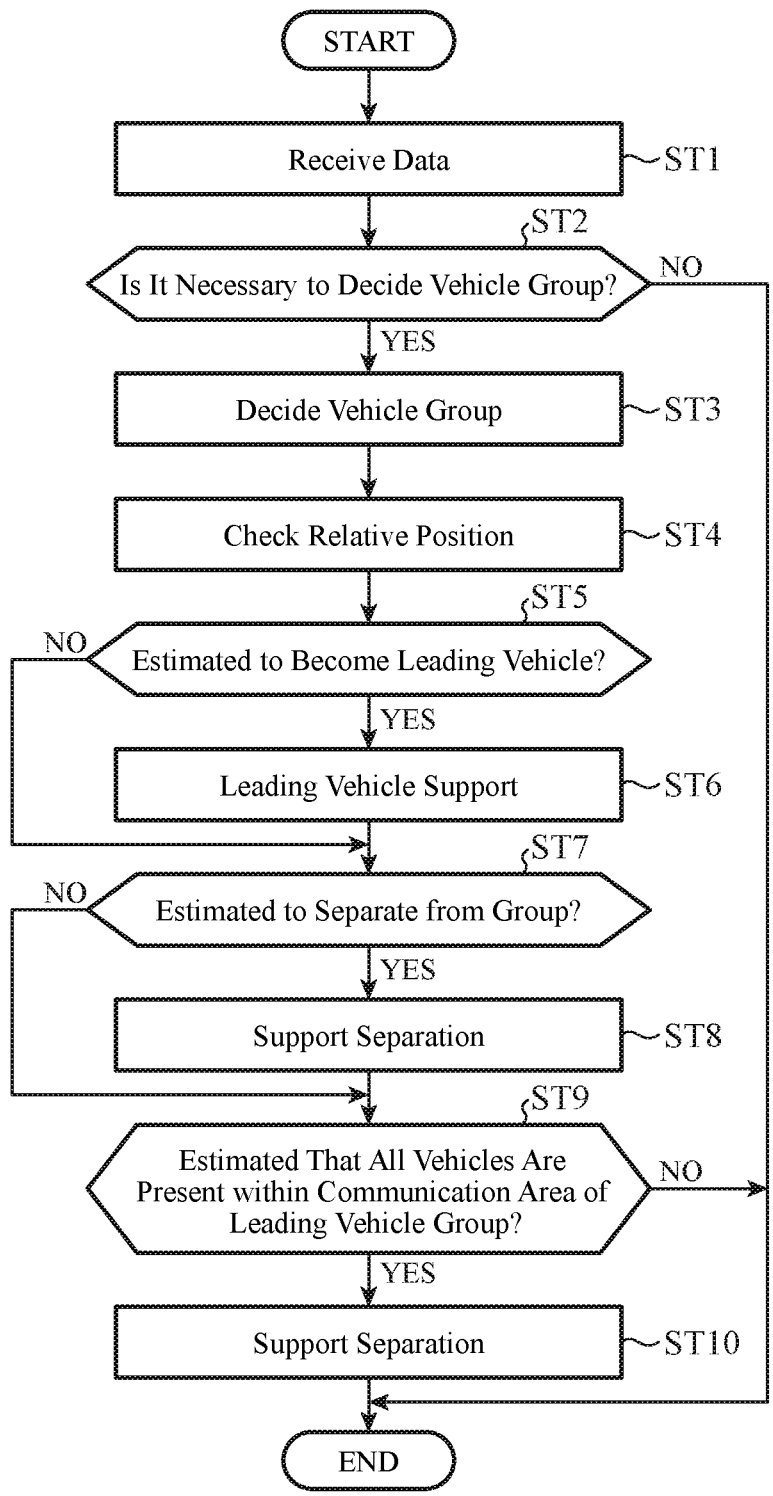
FIG. 4 is a flowchart showing an operation example at the time of a vehicle group decision of the inter-vehicle communication device of the embodiment 1.

FIG. 4 shows an example of an operational flow of the inter-vehicle communication device at the time of a vehicle group decision. After establishing the inter-vehicle communication among the vehicles, the controller 110 transmits the vehicle information about the vehicle via the communication unit 111, and receives the vehicle information other vehicles transmit via the communication unit 111 (step ST1). When the number of the vehicle information items received is not less than the number of the vehicle groups, that is, when five or more vehicle information items are present including the vehicle information about the vehicle, the controller 110 decides that the vehicle group decision is necessary ("YES" at step ST2) because as many as vehicles necessary for constructing the inter-vehicle communication network shown in FIG. 1 are present around the vehicle. In contrast, when the number of the vehicle information items is less than the number of the vehicle groups, the controller 110 decides that the vehicle group decision is unnecessary ("NO" at step ST2), and terminates the processing.

At step ST3, the controller 110 decides the vehicle group, or obtains the vehicle group provided from the outside. Although an example of a deciding method of the vehicle group will be shown from now on, we do not care about the deciding method.

For example, if the individual vehicles shown in FIG. 1 carry out the inter-vehicle communication to support drivers using the same application (an automatic vehicle-control support application of a navigation system or smartphone, for example), the controller 110 can decide the vehicle group to which it belongs among the leading vehicle group 1, data transfer vehicle groups 2 and 3, data composite vehicle group 4, and the following vehicle groups 5 and 6 by grasping the relative positional relationships between the vehicle and its surrounding vehicles.

The positional information of the vehicle can be obtained from the vehicle information acquiring unit 12. Alternatively, it can be calculated from the GPS positional information obtained from the GPS information acquiring unit 13 and the map information available from a smartphone, navigation system, map server or the like.

As the positional information of other vehicles, it is possible to use the GPS positional information contained in the communication establishment information exchanged between the vehicles at the establishment of the inter-vehicle communication.

Incidentally, as for the decision of the vehicle group, the controller 110 can make it by itself, or the external equipment (such as a server) can make it. When a server is used, the server collects the positional information of all the vehicles equipped with the inter-vehicle communication device, decides the vehicle group, and informs the individual vehicles of that.

In addition, to use the inter-vehicle communication to support travel in a row during driving between friends, the input unit 16 receives a driver's selection as to whether his or her vehicle travels as the leading vehicle group 1 or not, thus deciding the vehicle that serves as the leading vehicle group 1 in advance. Accordingly, the controller 110 determined as the leading vehicle group 1 can decide the groups of the other vehicles, and informs the other vehicles of the decision results.

After the vehicle group decision, according to the positional information about the vehicle the vehicle information acquiring unit 12 or the GPS information acquiring unit 13 obtains, and the history of the vehicle positions of the surrounding vehicles such as their GPS positional information contained in the communication establishment information, the controller 110 confirms the relative position between the vehicle and the surrounding vehicles, and estimates chances of relative positional relationships (step ST4). As a result of confirming the relative positional relationships, if the controller 110 estimates the changes as will be described later, it provides various support in accordance with the estimation.

More specifically, if the controller 110 estimates that the vehicle will go ahead of the surrounding vehicles and estimates that it will become the leading vehicle group 1 ("YES" at step ST5), the controller 110 provides the support of informing the driver of that via the informing unit 15 (step ST5). Otherwise ("NO" at step ST5), it proceeds to step ST7.

In addition, the controller 110 not only informs that the vehicle will become the leading vehicle group 1 via the informing unit 15, but also causes the informing unit 15 to display information for enabling a driver to select whether to become the leading vehicle or not so as to prevent poor or diffident driver from leading the other vehicle groups as the leading vehicle group 1, or causes the informing unit 15 to display information for setting an auto cruise driving speed when becoming the leading vehicle group 1 during auto cruise support. Thus, it can provide user-friendly support for the driver.

After that, when the controller 110 estimates that a certain vehicle group will disappear because all the vehicles belonging to the vehicle group separate from the group ("YES" at step ST7), the controller 110 carries out support of recommending the driver to move near a separating vehicle via the informing unit 15 to play the role of the separating vehicle (step ST8). Otherwise ("NO" at step ST7), it proceeds to step ST9.

In addition, the controller 110 can cause the informing unit 15 to display information for enabling the driver to select whether to move near the separating vehicle or not. Furthermore, when receiving a response to accept the move from the driver via the input unit 16, the controller 110 can instruct the support unit 14 to carry out the vehicle control for moving the vehicle to a position at which the vehicle can play the role of the vehicle group disappeared. After the vehicle moves, it plays the role of the vehicle group disappeared instead of the vehicle separated.

Thus, when a vehicle leaves the data transfer vehicle group 2 or 3 which consists of a single vehicle, the data composite vehicle group 4 or the following vehicle groups 5 and 6 each of which consists of a plurality of vehicles can supply the data transfer vehicle group 2 or 3 with the vehicle. In addition, when all the vehicles separate from the data composite vehicle group 4, the following vehicle groups 5 and 6 can supply the data composite vehicle group 4 with a vehicle. Thus, the inter-vehicle communication network can be maintained.

Finally, when the controller 110 estimates that all the vehicles constituting the inter-vehicle communication network are present within the communication area of the leading vehicle group 1 ("YES" at step ST9), the controller 110 controls the communication unit 111 so as to leave the vehicle group to which it belongs and to receive the vehicle information directly from the vehicle of the leading vehicle group 1 (step ST10). At the time, the transfer necessity deciding unit 115 decides not to transfer the received vehicle information to the other vehicles, and does not transfer the vehicle information to the other vehicle groups. Thus, when all the vehicles are present within the communication area of the leading vehicle group 1, it becomes possible to reduce the time taken for sharing the data because the item (2) "without performing data transfer, the individual vehicles carry out communication directly with the leading vehicle group 1" is implemented as will be described later.

Otherwise ("NO" at step ST9), the processing is terminated.

Incidentally, as long as the inter-vehicle communication device executes the operation shown in FIG. 4 regularly, it can reconstruct the vehicle groups in accordance with the vehicle conditions, even if the traveling order varies owing to changes in road conditions such as congestion and restrictions of the individual lanes, thereby being able to maintain the inter-vehicle communication.

(2) At Data Transfer

Figure 5:
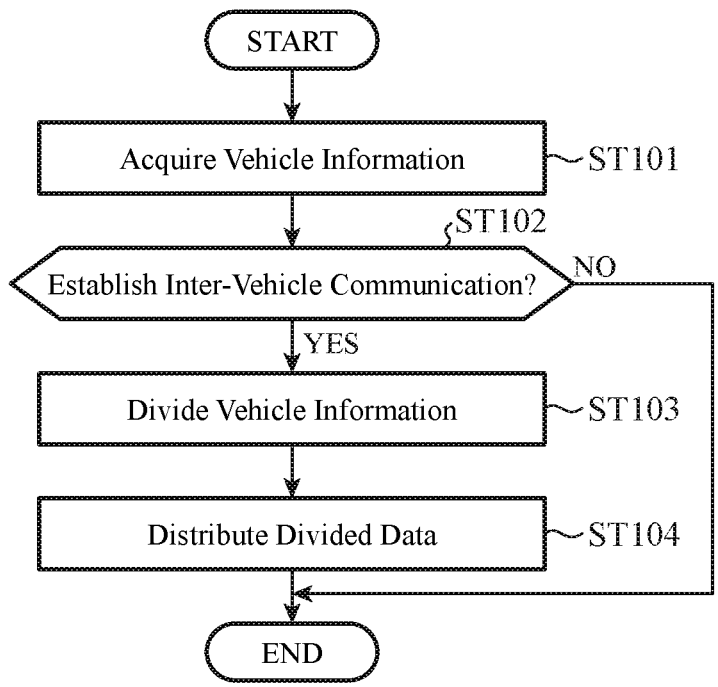
FIG. 5 is a flowchart showing an operation example at the time of data transfer of the inter-vehicle communication device mounted on the vehicle of a leading vehicle group.
Figure 6:
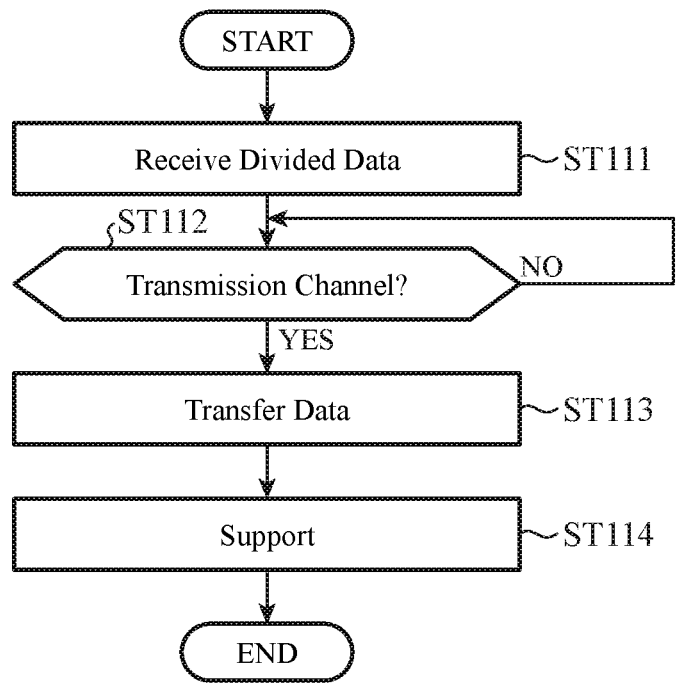
FIG. 6 is a flowchart showing an operation example at the time of data transfer of the inter-vehicle communication device mounted on the vehicle of a data transfer vehicle group.
Figure 7:
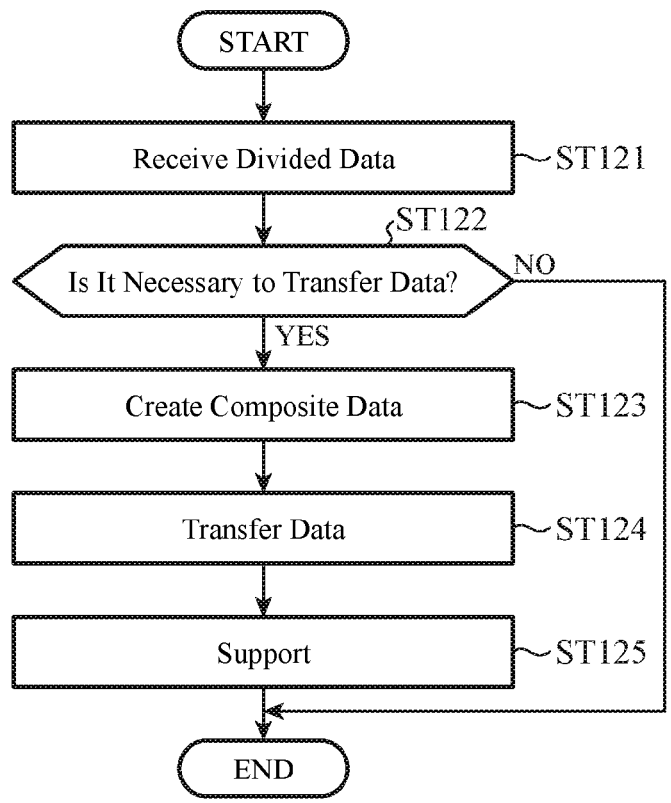
FIG. 7 is a flowchart showing an operation example at the time of data transfer of the inter-vehicle communication device mounted on a vehicle of a data composite vehicle group.
Figure 8:
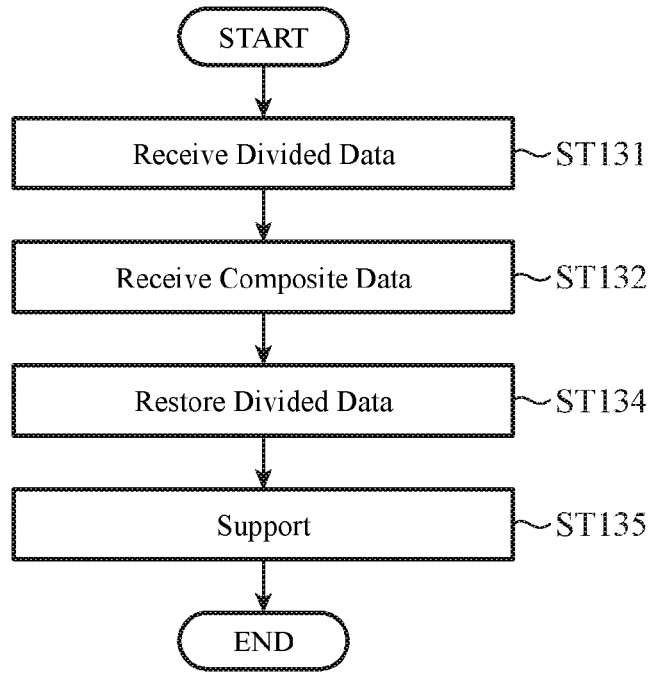
FIG. 8 is a flowchart showing an operation example at the time of data transfer of the inter-vehicle communication device mounted on a vehicle of a following vehicle group.

FIG. 5-FIG. 8 show an example of an operational flow of the inter-vehicle communication device at the time of data transfer. FIG. 5 shows an operational flow of the inter-vehicle communication device mounted on the vehicle of the leading vehicle group 1; FIG. 6 shows an operational flow of the inter-vehicle communication device mounted on the vehicle of the data transfer vehicle group 2 or 3; FIG. 7 shows an operational flow of the intervehicle communication device mounted on a vehicle of the data composite vehicle group 4; and FIG. 8 shows an operational flow of the inter-vehicle communication device mounted on a vehicle of the following vehicle group 5 or 6.

Figure 9:
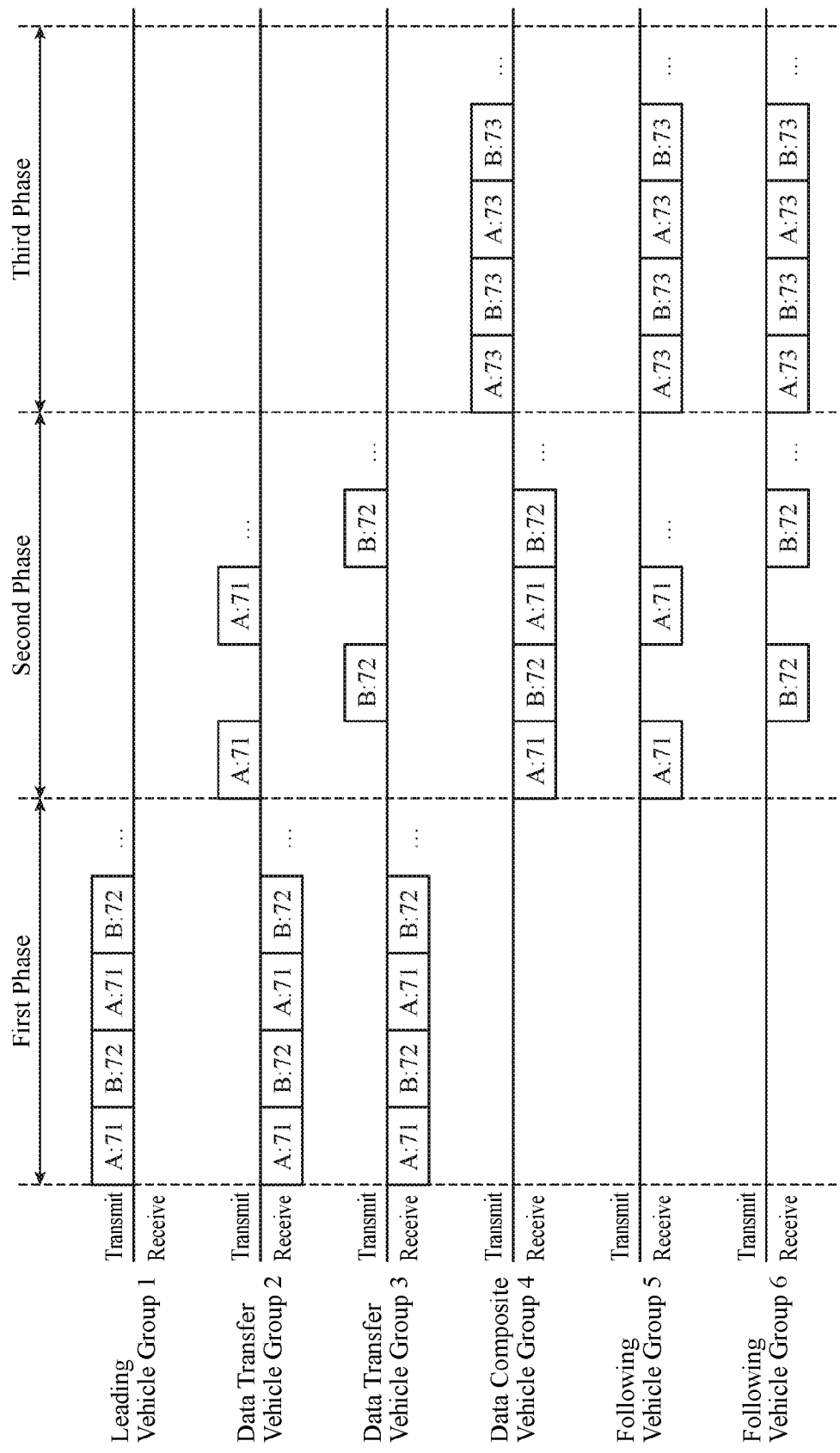
FIG. 9 is a timing chart showing a data transmission and reception manner of the inter-vehicle communication network of the embodiment 1.

FIG. 9 is a timing chart showing a data transmission and reception manner of the inter-vehicle communication network. The horizontal axes show time, and blocks on the horizontal axes represent transmitting processing, and blocks below the horizontal axes represent receiving processing, and alphabets in the individual blocks represent a communication channel (channel A or B) used for transmission and reception, and numerals in them represent a type of the data (divided data 71 or 72 or composite data 73).

The operation at the time of data transfer of each vehicle group will be described with reference to FIG. 1-FIG. 3 and FIG. 5-FIG. 9 from now on.

First, referring to FIG. 5, the operation will be described when the vehicle equipped with the inter-vehicle communication device belongs to the leading vehicle group 1. When the controller 110 decides that the vehicle belongs to the leading vehicle group 1, it obtains the vehicle information from the vehicle information acquiring unit 12, first (step ST101). After that, the controller 110 confirms that the inter-vehicle communication is established, and when established ("YES" at step ST102), the divided data generator 113 creates the divided data from the vehicle information supplied from the vehicle information acquiring unit 12 (step ST103).

As shown in FIG. 3, the channel setting unit 112 switches between the channels A and B of the communication unit 111 at regular time intervals. As shown in FIG. 9, the controller 110 transmits the divided data 71 to the data transfer vehicle group 2 while the communication channel of the communication unit 111 is switched to the channel A, and transmits the divided data 72 to the data transfer vehicle group 3 while it is switched to the channel B (step ST104).

If the inter-vehicle communication is not established ("NO" at step ST102), the controller 110 terminates the processing.

Next, referring to FIG. 6, the operation will be described when the vehicle equipped with the inter-vehicle communication device belongs to the data transfer vehicle group 2 or 3. As shown in FIG. 3, the channel setting unit 112 switches between the channels A and B of the communication unit 111 at regular time intervals. As shown in the first phase of FIG. 9, the communication unit 111 receives the divided data 71 from the leading vehicle group 1 when the communication channel is switched to the channel A, and receives the divided data 72 from the leading vehicle group 1 when it is switched to the channel B (step ST111). The controller 110 stores the divided data 71 and 72 received via the communication unit 111 and the vehicle information 7 restored from the divided data 71 and 72 in the received data storage 114.

After storing the received data, and after the transfer necessity deciding unit 115 decides the necessity of the data transfer, the controller 110 confirms the communication channel of the communication unit 111 at regular time intervals (step ST112), and if the communication channel is switched to the communication channel that has been used for the communication with the leading vehicle group 1 ("YES" at step ST112), the controller 110 carries out broadcast transfer of the divided data using the communication channel (step ST113). More specifically, as shown in the second phase of FIG. 9, the controller 110 of the data transfer vehicle group 2 carries out the broadcast transfer of the divided data 71 when the communication unit 111 is switched to the channel A. On the other hand, the controller 110 of the data transfer vehicle group 3 carries out the broadcast transfer of the divided data 72 when the communication unit 111 is switched to the channel B.

When completing the transmission and reception of the divided data, the controller 110 outputs the vehicle information 7 stored in the received data storage 114 to the support unit 14 so that the support unit 14 provides various support according to the vehicle information 7 (step ST114). For example, when the leading vehicle of the leading vehicle group 1 travels at a constant speed because of the auto cruise function of the support unit 14, the vehicle support unit 14 belonging to the data transfer vehicle group 2 or 3 controls the acceleration and deceleration of the vehicle in accordance with the driving speed of the leading vehicle contained in the vehicle information 7, thereby supporting the vehicle to follow the leading vehicle.

Next, referring to FIG. 7, the operation will be described when the vehicle equipped with the inter-vehicle communication device belongs to the data composite vehicle group 4. As shown in FIG. 3, the channel setting unit 112 switches between the channels A and B of the communication unit 111 at regular time intervals. As shown in the second phase of FIG. 9, the communication unit 111 receives the divided data 71 from the data transfer vehicle group 2 when the communication channel is switched to the channel A, and receives the divided data 72 from the data transfer vehicle group 3 when it is switched to the channel B (step ST121). The controller 110 stores the divided data 71 and 72 received via the communication unit 111 and the vehicle information 7 restored from the divided data 71 and 72 in the received data storage 114.

Next, the transfer necessity deciding unit 115 decides the necessity of the data transfer (step ST122). More specifically, after receiving the divided data, the transfer necessity deciding unit 115 checks whether the inter-vehicle communication band (channel A or B, here) is unused or not, and decides that the transfer is necessary when it is unused. When the transfer necessity deciding unit 115 decides that the data transfer is necessary (step ST122), the controller 110 supplies the divided data 71 and 72 stored in the received data storage 114 to the XOR circuit 116, first, and the XOR circuit 116 creates the composite data 73 from the divided data 71 and 72 (step ST123). Next, as shown in the third phase of FIG. 9, the controller 110 transfers the composite data 73 to the following vehicle groups 5 and 6 using the two channels A and B used at receiving the divided data (step ST124).

In addition, simultaneously with the transfer of the composite data 73, the controller 110 supplies the support unit 14 with the vehicle information 7 stored in the received data storage 114 so that the support unit 14 provides various support in accordance with the vehicle information 7 (step ST125).

Next, referring to FIG. 6, the operation will he described when the vehicle equipped with the inter-vehicle communication device belongs to the following vehicle group 5 or 6. As shown in FIG. 3, the channel setting unit 112 switches between the channels A and B of the communication unit 111 at regular time intervals. As shown in the second phase of FIG. 9, the communication unit 111 of the following vehicle group 5 receives the divided data 71 from the data transfer vehicle group 2 when the communication channel is switched to the channel A. On the other hand, the communication unit 111 of the following vehicle group 6 receives the divided data 72 from the data transfer vehicle group 3 when the communication channel is switched to the channel B (step ST131). The controller 110 stores the divided data 71 or divided data 72 received via the communication unit 111 in the received data storage 114.

Next, as shown in the third phase of FIG. 9, each communication unit 111 of the following vehicle groups 5 and 6 receives the composite data 73 from the data composite vehicle group 4 (step ST132). After receiving the composite data, the controller 110 of the following vehicle group 5 supplies the divided data 71 and composite data 73 received to the XOR circuit 116 so as to cause the XOR circuit 116 to create the restored divided data 72a (step ST134), restores the vehicle information 7 from the restored divided data 72a and divided data 71, and stores it in the received data storage 114. On the other hand, the controller 110 of the following vehicle group 6 supplies the divided data 72 and the composite data 73 received to the XOR circuit 116 so as to cause the XOR circuit 116 to create the restored divided data 71a (step ST134), and restores the vehicle information 7 from the restored divided data 71a and divided data 72, and stores it in the received data storage 114.

Finally, the controller 110 supplies the support unit 14 with the vehicle information 7 stored in the received data storage 114 so that the support unit 14 provides various support in accordance with the vehicle information 7 (step ST135).

As described above, the inter-vehicle communication device of the embodiment 1 is configured in such a manner that when the vehicle belongs to the leading vehicle group 1, the controller 110 causes the vehicle information acquiring unit 12 to obtain the vehicle information, causes the divided data generator 113 to create a plurality of divided data, and causes the communication unit 111 to transmit them to the data transfer vehicle groups 2 and 3.

In addition, when the vehicle belongs to the data transfer vehicle group 2 or 3, the controller 110 causes the communication unit 111 to receive the plurality of divided data to restore the vehicle information, and causes the communication unit 111 to transmit a part of the divided data to the data composite vehicle group 4 and the following vehicle groups 5 and 6.

In addition, when the vehicle belongs to the data composite vehicle group 4, the controller 110 causes the communication unit 111 to receive all the divided data the data transfer vehicle groups 2 and 3 transmit to restore the vehicle information, causes the XOR circuit 116 to create the composite data, and causes the communication unit 111 to transmit it to the following vehicle groups 5 and 6.

In addition, when the vehicle belongs to the following vehicle group 5 or 6, the controller 110 causes the communication unit 111 to receive a part of the divided data the data transfer vehicle group 2 or 3 transmits and the composite data the data composite vehicle group 4 transmits, causes the XOR circuit 116 to restore the remaining divided data, and restores the vehicle information from the part of the divided data and the remaining divided data Thus, the present embodiment 1 divides the vehicles constituting the inter-vehicle communication network into several vehicle groups so that the leading vehicle side transmits the divided data resulting from dividing the vehicle information and the composite data resulting from XORing the divided data, and the following vehicle side restores the unreceived remaining divided data from the received divided data, thereby optimizing the data transfer between the individual vehicle groups. Accordingly, it can reduce the amount of the data transfer and ease the congestion.

Incidentally, the inter-vehicle communication device can achieve the foregoing advantages by comprising at least the communication unit 111, vehicle information acquiring unit 12, divided data generator 113, XOR circuit 116 and controller 110. However, the received data storage 114, transfer necessity deciding unit 115, channel setting unit 112, GPS information acquiring unit 13, support unit 14, informing unit 15 and input unit 16 shown in FIG. 2 are not essential components.

In addition, according to the embodiment 1, the controller 110 is made to construct the vehicle groups in accordance with the positional relationships between vehicles constituting the inter-vehicle communication network. Accordingly, it can maintain the inter-vehicle communication even if the vehicle conditions change.

In addition, according to the embodiment 1, the controller 110 is made to reconstruct the vehicle groups when the vehicle traveling order alters, and to switch the communication control method. In accordance with the vehicle groups reconstructed. Accordingly, it can maintain the inter-vehicle communication even when the vehicle traveling order changes owing to the congestion of individual lanes and the difference of road conditions such as signs.

In addition, according to the embodiment 1, when the vehicle belongs to the leading vehicle group 1, the controller 110 is made to give information that it becomes the leading vehicle to its driver through the informing unit 15 mounted on the vehicle. This enables the driver to recognize the changes of the vehicle conditions, and can clear up an uncomfortable feeling at the time when the support contents of the support unit 14 alters in accordance with the changes of the vehicle conditions.

In addition, according to the embodiment 1, the controller 110 is made to receive the driver's selection as to whether he or she will drive as the leading vehicle via the input unit 16 mounted on the vehicle. This enables the driver to select as to whether to become the leading vehicle or not, which makes it possible for a diffident driver to avoid to become the leading vehicle, for example. Thus, the support unit 14 can provide the support by considering the needs of the driver.

In addition, according to the embodiment 1, the controller 110 is configured in such a manner that when the support unit 14 is carrying out the auto cruise control and the vehicle belongs to the leading vehicle group 1, it causes the informing unit 15 to inform the driver that he or she can set the driving speed of the vehicle. Accordingly, the driver can grasp the timing for setting the driving speed of the auto cruise support.

In addition, according to the embodiment 1, the controller 110 is configured in such a manner that when all the vehicles constituting the inter-vehicle communication network are present within an area capable of carrying out the inter-vehicle communication with the leading vehicle group 1, the transfer necessity deciding unit 115 in the controller 110 controls the communication unit 111 so that it obtains the vehicle information directly from the leading vehicle group, and does not transfer the vehicle information it obtains to the other vehicles. Accordingly, it can select a communication method capable of reducing the communication time period in accordance with the positional relationships between the vehicles.

In addition, according to the embodiment 1, the controller 110 is configured in such a manner that when some other vehicle which belongs to one of the vehicle groups consisting of the leading vehicle group 1, the data transfer vehicle groups 2 and 3, and the data composite vehicle group 4 separates from its group, it provides the driver via the informing unit 15 with the information for prompting the driver to move to the position of the vehicle group from which the some other vehicle separates. Accordingly, even when some other vehicle separates during the inter-vehicle communication, the embodiment 1 can maintain or recover the inter-vehicle communication.

In addition, according to the embodiment 1, the controller 110 is configured in such a manner that when some other vehicle which belongs to one of the vehicle groups consisting of the leading vehicle group 1, the data transfer vehicle groups 2 and 3, and the data composite vehicle group 4, it instructs the support unit 14 to move the vehicle to the position of the vehicle group from which the some other vehicle separates. Accordingly, even when some other vehicle separates during the inter-vehicle communication, the embodiment 1 can maintain or recover the inter-vehicle communication automatically. In addition, since it supports the movement after informing the user of that, the embodiment 1 can clear up an uncomfortable feeling at the time when the vehicle changes its position automatically.

In addition, according to the embodiment 1, the controller 110 is configured in such a manner that when the vehicle moves to the position of a vehicle group from which some other vehicle separates, it switches the communication control method to the one that corresponds to the vehicle group. Accordingly, it can maintain the inter-vehicle communication.

In addition, according to the embodiment 1, the inter-vehicle communication device is configured in such a manner that it comprises the channel setting unit 112 for controlling the communication channels (channels A and B shown in FIG. 3 and FIG. 9) and the communication periods of time (first to third phases shown in FIG. 9) the communication unit 111 uses for the data transmission and reception, and that the channel setting unit 112 causes the data transmission and reception between the vehicle groups including the vehicle, to be performed during the communication period of time different, from that of the data transmission and reception between other vehicle groups. Thus, it can prevent the communication between the vehicle groups including the vehicle from being performed through the same communication channel and at the same communication period of time as the communication between other vehicle groups, thereby being able to avoid a data collision.

Embodiment 2

In the embodiment 2, the inter-vehicle communication device with the same configuration as that of the embodiment 1 changes communication channels it uses to increase the efficiency of the data transfer throughout the inter-vehicle communication network and to reduce the communication delay. Here, referring to the inter-vehicle communication network shown in FIG. 1 and the inter-vehicle communication device shown in FIG. 2, the present embodiment 2 will be described, Although the operation of the inter-vehicle communication device will be described from now on, since the item (1) operation at a vehicle group decision is the same as that of the embodiment 1, its description will be omitted, and the item (2) operation at the time of data transfer will be described.

(2) At Data Transfer

FIG. 10 is a diagram illustrating a switching manner of the communication channels of the individual vehicle groups of the embodiment 2. The embodiment 2 uses four communication channels in total (referred to as channels A, B, C, and D from now on) by all the inter-vehicle communication devices. The channel setting units 112 of the individual inter-vehicle communication devices perform the communication channel switching of the communication units 111 together at regular period intervals as shown in FIG, 10, thereby realizing simultaneous communication, More specifically, the communication between the leading vehicle group 1 and the data transfer vehicle group 2 or 3 uses a channel A or B; the communication between the data transfer vehicle group 2 and the data composite vehicle group 4 or the following vehicle group 5 uses a channel C; and the communication between the data transfer vehicle group 3 and the data composite vehicle group 4 or the following vehicle group 6 uses a channel D. Furthermore, although not shown in FIG. 10, the channel setting unit 112 reestablishes the channel C of the data transfer vehicle group 2 to the channel B, and reestablishes the channel D of the data transfer vehicle group 3 to the channel A so as to use them for the communication between the data transfer vehicle groups 2 and 3. Its details will be described later.

Figure 11:
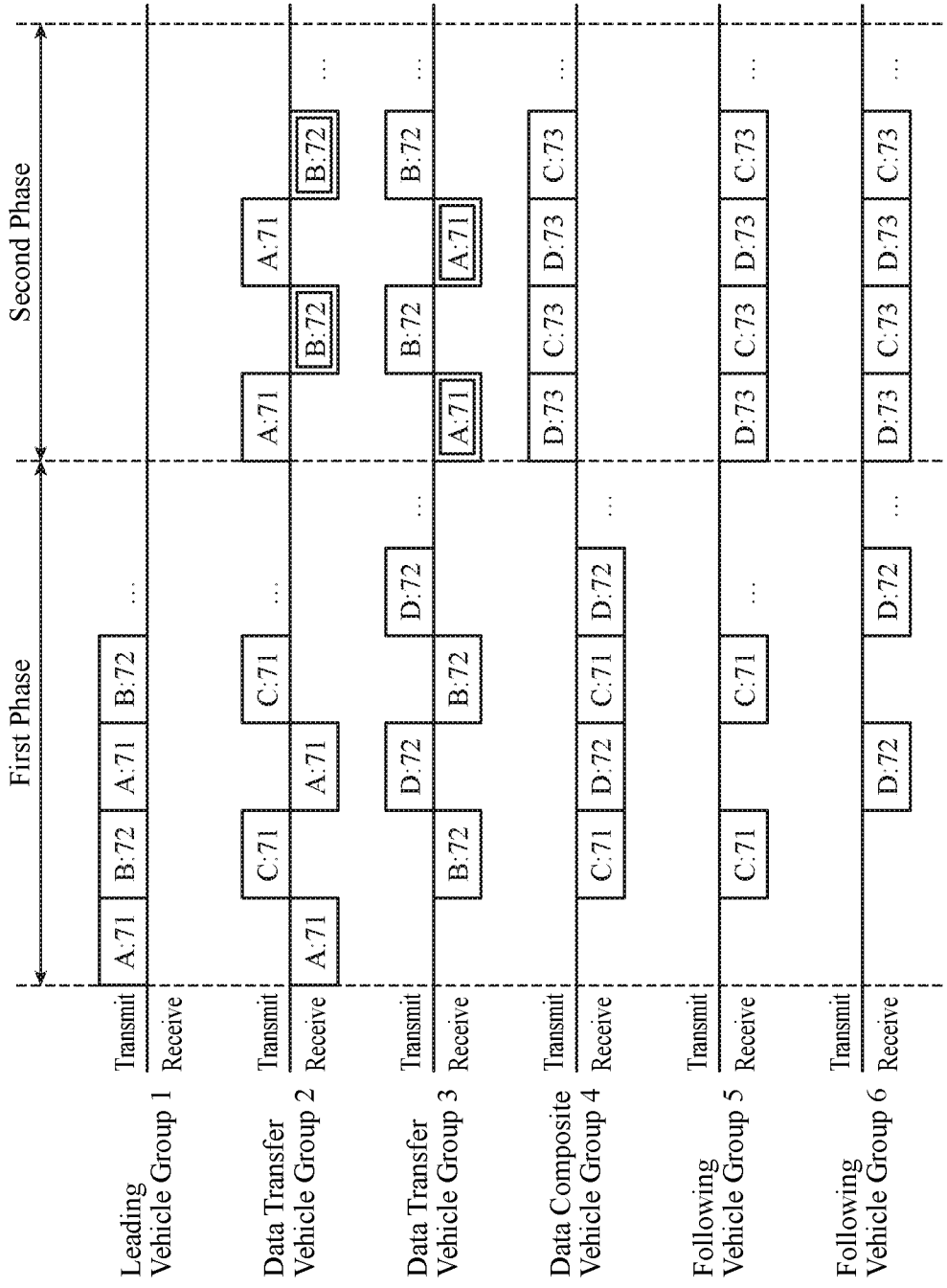
FIG. 11 is a timing chart showing a data transmission and reception manner of the inter-vehicle communication network of the embodiment 2.

FIG. 11 is a timing chart showing a data transmission and reception manner of the inter-vehicle communication network. As in FIG. 9, the horizontal axes show time, and blocks on the horizontal axes represent transmitting processing and blocks below the horizontal axes represent receiving processing, and alphabets in the individual blocks represent a communication channel (channels A to D) used for transmission and reception, and numerals in them represent a type of the data (divided data 71 or 72 or composite data 73).

The operation at the time of data transfer will be described for each vehicle group from now on.

Incidentally, since the inter-vehicle communication device mounted on the vehicle of the leading vehicle group 1 is the same as that of the embodiment 1, its description will be omitted.

Figure 12:
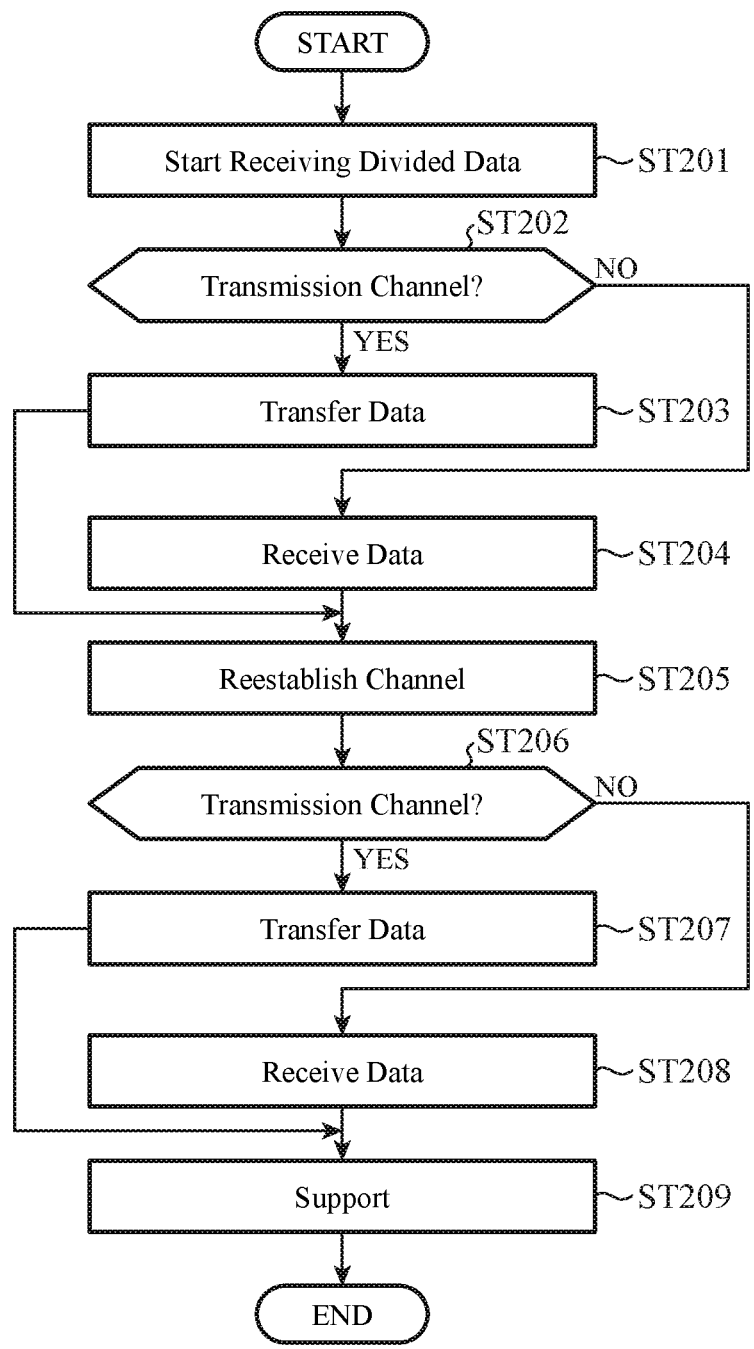
FIG. 12 is a flowchart showing an operation example at the time of data transfer of the inter-vehicle communication device mounted on the vehicle of a data transfer vehicle group.

FIG. 12 shows an operational flow at the time of data transfer of the inter-vehicle communication device mounted on the vehicle of the data transfer vehicle group 2 or 3. First, as shown in FIG. 10, the channel setting unit 112 of the data transfer vehicle group 2 switches between the channels A and C of the communication unit 111 at regular time intervals, and the channel setting unit 112 of the data transfer vehicle group 3 switches between the channels D and B of the communication unit 111 at regular time intervals.

In the switching state, the inter-vehicle communication device belonging to the data transfer vehicle group 2 or 3 starts receiving the divided data from the leading vehicle group 1 (step ST201), it carries out the reception and transmission of the divided data simultaneously in the first phase of FIG. 11.

More specifically, if the controller 110 checks the communication channel of the communication unit 111 at regular time intervals (step ST202), and confirms that it is switched to the communication channel (channel A for the data transfer vehicle group 2, and channel B for the data transfer vehicle group 3) used for the communication with the leading vehicle group 1 ("NO" at step ST202), it receives the divided data 71 or divided data 72 from the leading vehicle group 1 (step ST204). The controller 110 stores the divided data 71 or divided data 72 received via the communication unit 111 in the received data storage 114.

In addition, if the controller 110 confirms that communication channel is switched to the other communication channel (channel C for the data transfer vehicle group 2 and channel 0 for the data transfer vehicle group 3) ("YES" at step ST202), the controller 110 performs the broadcast transfer of the divided data 71 or divided data 72 received from the leading vehicle group 1 (step ST203).

When the reception and transfer of the divided data 71 and 72 are completed in the first phase of FIG. 11, then the channel setting unit 112 reestablishes the communication channel of the communication unit 111 (step ST205). More specifically, the channel setting unit 112 of the data transfer vehicle group 2 changes the channel C, which has been used for transferring the divided data 71 from the data transfer vehicle group 2 to the data composite vehicle group 4 and the following vehicle group 5, to the channel B which has been used for the communication between the other data transfer vehicle group 3 and the leading vehicle group 1, and the channel B is used for the data transfer between the data transfer vehicle groups 2 and 3 (shown by a double block in FIG. 11).

On the other hand, the channel setting unit 112 of the data transfer vehicle group 3 changes the channel D, which has been used for transferring the divided data 72 from the data transfer vehicle group 3 to the data composite vehicle group 4 and the following vehicle group 6, to the channel A which has been used for the communication between the other data transfer vehicle group 2 and the leading vehicle group 1, and the channel A is used for the data transfer between the data transfer vehicle groups 2 and 3 (shown by a double block in FIG. 11).

After the reestablishment of the communication channels, the switching of the channel A or B is synchronized between the data transfer vehicle group 2 and the data transfer vehicle group 3 so that the transfer of the already received divided data and the reception of the unreceived divided data are carried out simultaneously in the second phase of FIG. 11.

More specifically, when the controller 110 of the data transfer vehicle group 2 checks the communication channel of the communication unit 111 at regular time intervals (step ST206), and confirms that it has been switched to the channel A ("YES" at step ST206), it transfers the divided data 71 received in the first phase to the data transfer vehicle group 3 (step ST207). When it confirms that the channel has been switched to the channel B ("NO" at step ST206), it receives the divided data 72 unreceived in the first phase from the data transfer vehicle group 3 (step ST208). The controller 110 combines the divided data. 72 received at step ST208 with the divided data 71 received at step ST204 to restore the vehicle information 7 and stores it in the received data storage 114.

On the other hand, when the controller 110 of the data transfer vehicle group 3 checks the communication channel of the communication unit. 111 at regular time intervals (step ST206), and confirms that it has been switched to the channel B ("YES" at step ST206), it transfers the divided data 72 received in the first phase to the data transfer vehicle group 2 (step ST207). When it confirms that the channel has been switched to the channel A ("NO" at step ST206), it receives the divided data 71 unreceived in the first phase from the data transfer vehicle group 2 (step ST208). The controller 110 combines the divided data 71 received at step ST208 with the divided data 72 received at step ST204 to restore the vehicle information 7 and stores it in the received data storage 114.

After completing the foregoing processing, the controller 110 of the data transfer vehicle group 2 or 3 supplies the vehicle information 7 stored in the received data storage 114 to the support unit 14 so that the support unit 14 provides various support in accordance with the vehicle information 7 (step ST209).

As for the inter-vehicle communication devices mounted on vehicles belonging to the data composite vehicle group 4 and the following vehicle groups 5 and 6, their operations are the same as those of the embodiment 1 except for the communication channels to be used. Only as shown in FIG. 11, since they can transfer the divided data from the leading vehicle group 1 to the data transfer vehicle groups 2 and 3, and then to the data composite vehicle group 4 and the following vehicle groups 5 and 6 via in the first phase, and transfer the composite data from the data composite vehicle group 4 to the following vehicle groups 5 and 6 in the second phase, the data transfer from the leading vehicle group 1 to the following vehicle groups 5 and 6 can be completed in the two phases.

In contrast with this, the communication method of the foregoing embodiment 1 requires three phases for the data transfer from the leading vehicle group 1 to the following vehicle groups 5 and 6 as shown in FIG. 9 because it transmits the divided data from the leading vehicle group 1 to the data transfer vehicle groups 2 and 3 in the first phase, transfers the divided data from the data transfer vehicle groups 2 and 3 to the data composite vehicle group 4 and the following vehicle groups 5 and 6 in the second phase, and transfers the composite data from the data composite vehicle group 4 to the following vehicle groups 5 and 6 in the third phase.

As described above, according to the embodiment 2, the inter-vehicle communication device comprises the channel setting unit 112 that controls the communication channels (channels A-D shown in FIG. 10 and FIG. 11) the communication unit. 111 uses for transmitting and receiving data and the communication period of time (first and second phases shown in FIG. 11), in which the channel setting unit 112 changes the communication channels between the data transmission and reception among the vehicle groups including one's own vehicle and the data transmission and reception among the other vehicle groups. Thus, when carrying out communication among the vehicle groups including one's own vehicle, it can prevent using the same communication channels and the same communication period of time the other vehicle groups use for their communication, thereby being able to avoid the data collision.

In particular, in the embodiment 2, the channel setting unit 112 controls the communication unit 111 so as to carry out the transmission and reception among the vehicle groups including the one's own vehicle through the communication channels different from those used for the data transmission and reception among the other vehicle groups, thereby enabling the parallel communication within the same communication period of time. This makes it possible, for example, to carry out the divided data transmission and reception among the leading vehicle group 1 and the data transfer vehicle groups 2 and 3, and the divided data transmission and reception among the data transfer vehicle groups 2 and 3 and the data composite vehicle group 4 and the following vehicle groups 5 and 6 in the first phase, thereby being able to reduce the communication delay in the inter-vehicle communication network.

Embodiment 3

In the embodiment 3, the inter-vehicle communication device comprises a plurality of communication units that enable simultaneous multi-channel communication so as to reduce the communication delay throughout the inter-vehicle communication network as compared with that of the embodiment 1 or 2.

Figure 13:
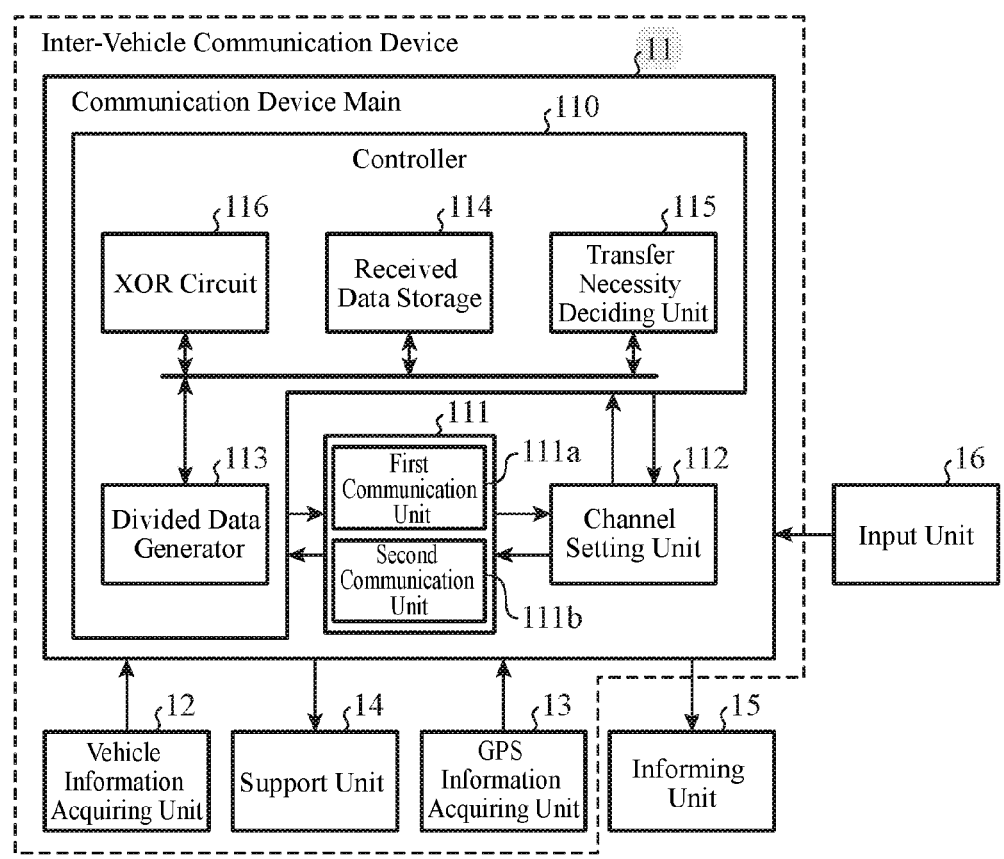
FIG. 13 is a block diagram showing a configuration of an inter-vehicle communication device of an embodiment 3 in accordance with the present invention.

FIG. 13 shows a configuration of the inter-vehicle communication device of the embodiment 3. Incidentally, in FIG. 13, the same or like components to those of FIG. 2 are designated by the same reference numerals and their description will be omitted. In the present embodiment 3, the communication unit 111 comprises the first communication unit 111*a* and the second communication unit 111*b* to realize parallel transmission and reception and simultaneous data reception from two inter-vehicle communication devices. As for the frequency bands (communication channels) the first communication unit 111*a* and second communication unit 111*b* use for their wireless communication, the channel setting unit 112 establishes them. In addition, when the first communication unit 111*a* and the second communication unit 111*b* each carry out the parallel communication through two or more frequency bands as in the foregoing embodiment 1 or 2, the channel setting unit 112 switches the frequency bands at regular time intervals.

Using the two communication units 111 (first communication unit 111*a* and second communication unit 111*b*) in parallel can assign the channel A to the first communication unit 111*a* and the channel B to the second communication unit 111*b* when using the communication method of FIG. 3 of the foregoing embodiment 1, for example, thereby enabling the parallel communication. Accordingly, the present embodiment 3 can halve the time taken for the data transfer. Using three or more communication units 111 will be able to further reduce the time As described above, according to the embodiment 3, since it is configured in such a manner that the inter-vehicle communication device comprises the first communication unit 111*a* and the second communication unit 111*b*, it can further reduce the communication delay of the inter-vehicle communication network.

Incidentally, it is to be understood that a free combination of the individual embodiments, variations of any components of the individual embodiments or removal of any components of the individual embodiments is possible within the scope of the present invention.

INDUSTRIAL APPLICABILITY

As described above, an inter-vehicle communication device in accordance with the present invention optimizes the data transfer by dividing a plurality of vehicles into several vehicle groups. Accordingly, it is suitable for an inter-vehicle communication device used for support services that share the information of the leading vehicle with the following vehicles and carry out the auto cruise control and follow-up driving,

DESCRIPTION OF REFERENCE SYMBOLS

1 leading vehicle group; 2, 3 data transfer vehicle group; 4 data composite vehicle group; 5, 6 following vehicle group; 7 vehicle information; 71, 72 divided data; 71*a*, 72*a* restored divided data; 73 composite data; 11 communication device main; 12 vehicle information acquiring unit; 13 GPS information acquiring unit; 14 support unit; 15 informing unit; 16 input unit; 110 controller; 111 communication unit; 111*a* first communication unit; 111*b* second communication unit; 112 channel setting unit; 113 divided data generator; 114 received data storage; 115 transfer necessity deciding unit; 116 XOR circuit (exclusive OR circuit).

What is claimed is:

1. An inter-vehicle communication device comprising:
   a communicator to exchange data between its own vehicle and other vehicles between which inter-vehicle communication is established;
   a vehicle information acquirer to obtain vehicle information about its own vehicle;
   a divided data generator to create a plurality of divided data by dividing the vehicle information the vehicle information acquirer obtains;
   an XOR circuit to create composite data by XORing a plurality of divided data obtained from other vehicles via the communicator, or to restore remaining divided data by XORing a part of the divided data with the composite data obtained from other vehicles via the communicator; and a controller to switch a communication control method in accordance with a vehicle group, to which its own vehicle belongs, in an inter-vehicle communication network including a leading vehicle group, a data transfer vehicle group capable of inter-vehicle communication with the leading vehicle group, a data composite vehicle group capable of inter-vehicle communication with the data transfer vehicle group, and a following vehicle group capable of inter-vehicle communication with the data transfer vehicle group and the data composite vehicle group, wherein the controller:

causes, when its own vehicle belongs to the leading vehicle group, the vehicle information acquirer to obtain the vehicle information, the divided data generator to create a plurality of divided data, and the communicator to transmit the divided data to the data transfer vehicle group;

causes, when its own vehicle belongs to the data transfer vehicle group, the communicator to receive the plurality of divided data to restore the vehicle information, and causes the communicator to transmit a part of the divided data to the data composite vehicle group and to the following vehicle group;

causes, when its own vehicle belongs to the data composite vehicle group, the communicator to receive all the divided data the data transfer vehicle group transmits to restore the vehicle information, causes the XOR circuit to create the composite data, and causes the communicator to transmit the composite data to the following vehicle group; and causes, when its own vehicle belongs to the following vehicle group, the communicator to receive the part of the divided data the data transfer vehicle group transmits and the composite data the data composite vehicle group transmits, causes the XOR circuit to restore the remaining divided data, and restores the vehicle information from the part of the divided data and the remaining divided data.

2. The inter-vehicle communication device according to claim 1, wherein the controller constructs the vehicle groups in accordance with positional relationships between vehicles constituting the inter-vehicle communication network.

3. The inter-vehicle communication device according to claim 2, wherein the controller reconstructs the vehicle groups when a traveling order of the vehicles changes, and switches the communication control method in accordance with the vehicle groups reconstructed.

4. The inter-vehicle communication device according to claim 3, wherein the controller, when its own vehicle belongs to the leading vehicle group, informs a driver that its own vehicle has become a leading vehicle via an informer mounted in its own vehicle.

5. The inter-vehicle communication device according to claim 4, wherein the controller receives a selection of the driver as to whether to travel as the leading vehicle or not via an inputter mounted in its own vehicle.

6. The inter-vehicle communication device according to claim 4, further comprising:

a supporter to execute an auto cruise function that controls its own vehicle so as to travel at a fixed speed or to travel following the leading vehicle, wherein the controller, when the supporter executes the auto cruise function and when its own vehicle belongs to the leading vehicle group, informs the driver via the informer that the driver can set a driving speed of its own vehicle.

7. The inter-vehicle communication device according to claim 2, wherein the controller, when all the vehicles constituting the inter-vehicle communication network are present within a range that enables inter-vehicle communication with the leading vehicle group, controls the communicator so as to obtain the vehicle information directly from the leading vehicle group, and to prevent the communicator from transmitting the vehicle information obtained to other vehicles.

8. The inter-vehicle communication device according to claim 1, wherein the controller, when a vehicle belonging to any one of the vehicle groups consisting of the leading vehicle group, the data transfer vehicle group and the data composite vehicle group separates from the group, provides a driver, via the informer mounted in its own vehicle, with information for prompting the driver to move to the position of the vehicle group from which the vehicle separates.

9. The inter-vehicle communication device according to claim 8, further comprising:

a supporter to control the traveling of its own vehicle, wherein the controller, when a vehicle belonging to any one of the vehicle groups consisting of the leading vehicle group, the data transfer vehicle group, and the data composite vehicle group separates from the group, instructs the supporter to move its own vehicle to the position of the vehicle group from which the other vehicles separates.

10. The inter-vehicle communication device according to claim 8, wherein the controller, when its own vehicle moves to the position of the vehicle group from which the vehicle separates, switches a communication control method to the communication control method corresponding to the vehicle group.

11. The inter-vehicle communication device according to claim 1, further comprising:

a channel setter to control a communication channel the communicator uses for exchanging data, and to control a communication period of time, wherein the channel setter controls the communicator so that the communicator exchanges data between the vehicle groups including its own vehicle through the communication channel or at the communication period of time different from a communication channel or at a communication period of time used for exchanging data between other vehicle groups.

12. The inter-vehicle communication device according to claim 11, wherein the channel setter controls the communicator so that the communicator exchanges data between the vehicle groups including its own vehicle through the communication channel different from a communication channel used for exchanging data between other vehicle groups while allowing overlap of the communication periods of time.

13. The inter-vehicle communication device according to claim 12, wherein the channel setter controls the communicator so that the communicator exchanges data between the vehicle groups including its own vehicle in the same communication period of time as the communication period of time used for exchanging data between other vehicle groups.

14. The inter-vehicle communication device according to claim 11, wherein it comprises a plurality of the communicators.

\* \* \* \* \*